US012641017B2

(12) United States Patent
Nandakumaran

(10) Patent No.: US 12,641,017 B2
(45) Date of Patent: May 26, 2026

(54) INCREASING REPLICATION CAPABILITY IN A BROADCAST DOMAIN

(71) Applicant: Arista Networks, Inc., Santa Clara, CA (US)

(72) Inventor: Purushothaman Nandakumaran, Milpitas, CA (US)

(73) Assignee: Arista Networks, Inc., Santa Clara, CA (US)

( * ) Notice: Subject to any disclaimer, the term of this patent is extended or adjusted under 35 U.S.C. 154(b) by 35 days.

(21) Appl. No.: 18/679,926

(22) Filed: May 31, 2024

(65) Prior Publication Data

US 2025/0373547 A1     Dec. 4, 2025

(51) Int. Cl.
H04L 45/00 (2022.01)
H04L 12/18 (2006.01)
H04L 45/42 (2022.01)

(52) U.S. Cl.
CPC ........ H04L 45/566 (2013.01); H04L 12/1886 (2013.01); H04L 45/42 (2013.01); H04L 45/66 (2013.01)

(58) Field of Classification Search
None
See application file for complete search history.

(56) References Cited

U.S. PATENT DOCUMENTS

| | | | | |
|---|---|---|---|---|
| 7,940,766 B2 * | 5/2011 | Olakangil | ........... | H04L 12/4645 370/390 |
| 8,155,125 B1 * | 4/2012 | Borgione | ............ | H04L 12/4641 370/409 |

| | | | | |
|---|---|---|---|---|
| 8,184,628 B2 | 5/2012 | Cai et al. | | |
| 8,279,871 B1 * | 10/2012 | Sivan | .................. | H04L 12/4625 370/392 |
| 8,392,593 B1 | 3/2013 | Wadhwa et al. | | |
| 8,966,027 B1 | 2/2015 | Brandwine et al. | | |
| 10,581,793 B1 * | 3/2020 | Semwal | .............. | H04L 12/4641 |
| 10,887,209 B2 | 1/2021 | Nainar et al. | | |
| 11,102,107 B1 * | 8/2021 | Mishra | ................ | H04L 12/4641 |
| 11,546,249 B2 * | 1/2023 | Menon | .................... | H04L 12/46 |
| 11,636,229 B2 * | 4/2023 | Bisht | ................... | H04L 63/1416 37/329 |
| 12,047,277 B2 * | 7/2024 | Menon | .................... | H04L 12/46 |
| 12,568,364 B1 * | 3/2026 | Scriber | ................. | H04W 12/06 |

(Continued)

*Primary Examiner* — Jason D Cardone

(74) *Attorney, Agent, or Firm* — Treyz Law Group; Jason Tsai

(57) ABSTRACT

A network device can be configured to receive a packet to be replicated in accordance with a virtual local area network (VLAN) replication set having a number of members. The network device can further be configured to identify a first sub-broadcast or layer 2 (L2) domain for the packet and to identify a first sub-broadcast domain replication set corresponding to the first sub-broadcast domain. The first sub-broadcast domain replication set can have a number of members less than the number of members in the VLAN replication set. The network device can further be configured to identify a second sub-broadcast domain replication set for the packet, to replicate the packet a number of times for at least a portion of the members of the first sub-broadcast domain replication set, and to replicate a loopback packet a number of times for members of the second sub-broadcast domain replication set.

18 Claims, 6 Drawing Sheets

(56)           References Cited

U.S. PATENT DOCUMENTS

2008/0137660 A1*   6/2008  Olakangil ........... H04L 12/4645
                                                                    370/392
2013/0044764 A1*   2/2013  Casado .................. H04L 12/66
                                                                    709/201
2016/0020921 A1*   1/2016  Tsai .................... H04L 12/4675
                                                                    370/254
2018/0329671 A1*   11/2018  Einziger ................ H04W 4/02
2018/0367395 A1*   12/2018  Harneja ............. G06F 11/2289
2019/0123962 A1*   4/2019  Guo ........................ H04L 41/12
2019/0253208 A1*   8/2019  Grosser .................. H04L 43/10
2019/0296999 A1*   9/2019  Dutta ................. H04L 12/1854
2020/0042619 A1*   2/2020  Venkataramani ....... G06F 16/27
2022/0210062 A1*   6/2022  Brar ........................ H04L 49/70
2022/0345403 A1*   10/2022  Chen .................... H04L 45/566
2023/0139559 A1*   5/2023  Kadu ................. H04L 49/9057
                                                                    370/412
2023/0319625 A1*   10/2023  Sun ...................... H04L 1/1887
                                                                    370/328
2025/0030760 A1*   1/2025  Dong ................... G06F 9/5044

* cited by examiner

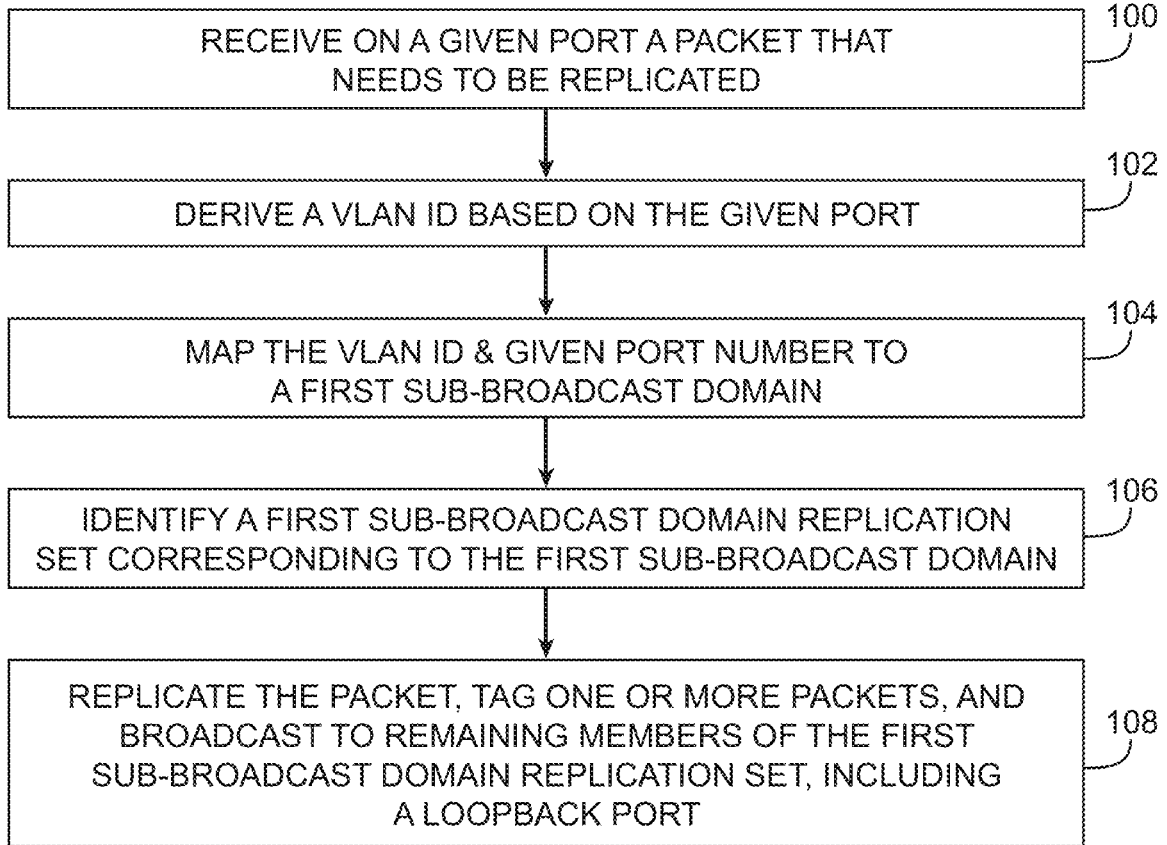

RECEIVE ON A GIVEN PORT A PACKET THAT
NEEDS TO BE REPLICATED — 100

DERIVE A VLAN ID BASED ON THE GIVEN PORT — 102

MAP THE VLAN ID & GIVEN PORT NUMBER TO
A FIRST SUB-BROADCAST DOMAIN — 104

IDENTIFY A FIRST SUB-BROADCAST DOMAIN REPLICATION
SET CORRESPONDING TO THE FIRST SUB-BROADCAST DOMAIN — 106

REPLICATE THE PACKET, TAG ONE OR MORE PACKETS, AND
BROADCAST TO REMAINING MEMBERS OF THE FIRST
SUB-BROADCAST DOMAIN REPLICATION SET, INCLUDING
A LOOPBACK PORT — 108

FIG. 3

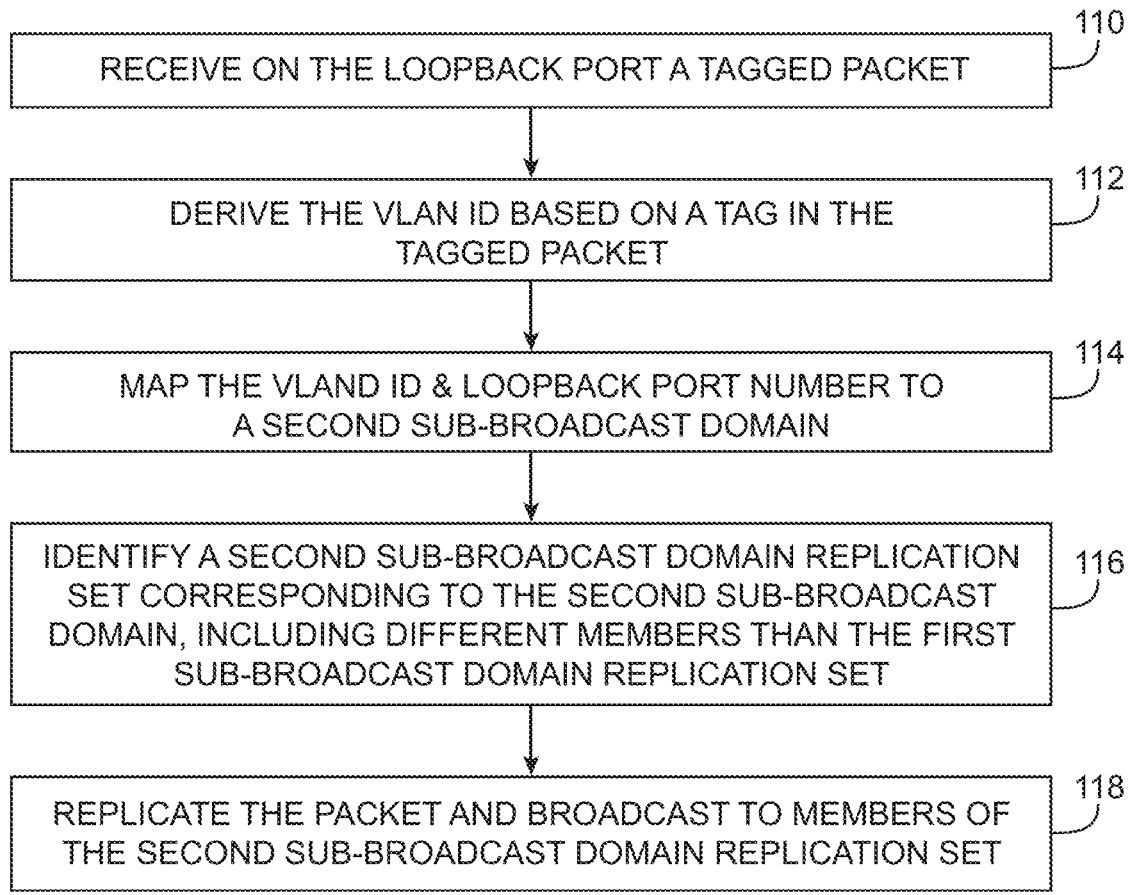

RECEIVE ON THE LOOPBACK PORT A TAGGED PACKET ⟋110

DERIVE THE VLAN ID BASED ON A TAG IN THE TAGGED PACKET ⟋112

MAP THE VLAND ID & LOOPBACK PORT NUMBER TO A SECOND SUB-BROADCAST DOMAIN ⟋114

IDENTIFY A SECOND SUB-BROADCAST DOMAIN REPLICATION SET CORRESPONDING TO THE SECOND SUB-BROADCAST DOMAIN, INCLUDING DIFFERENT MEMBERS THAN THE FIRST SUB-BROADCAST DOMAIN REPLICATION SET ⟋116

REPLICATE THE PACKET AND BROADCAST TO MEMBERS OF THE SECOND SUB-BROADCAST DOMAIN REPLICATION SET ⟋118

| SUB-BROADCAST DOMAIN X | SUB-BROADCAST DOMAIN REPLICATION SET X: (mem1x, mem2x, mem3x,....) |
| SUB-BROADCAST DOMAIN Y | SUB-BROADCAST DOMAIN REPLICATION SET Y: (mem1y, mem2y, mem3y,....) |
| SUB-BROADCAST DOMAIN Z | SUB-BROADCAST DOMAIN REPLICATION SET Z: (mem1z, mem2z, mem3z,....) |

INCREASING REPLICATION CAPABILITY IN A BROADCAST DOMAIN

BACKGROUND

A network device can be configured to route or switch traffic between various components in a network. Certain routing schemes may require replicating a packet and broadcasting the replicated packets to a large number of corresponding network components. A network device can include a packet replication module having an upper limit on the maximum number of replications that is supported by the module.

In certain scenarios or applications, however, a user of the network device might want to operate such a network device to perform a number of replications that exceeds the upper limit. Current state-of-the-art network devices, however, cannot support such operation. It is within such context that the embodiments herein arise.

BRIEF DESCRIPTION OF THE DRAWINGS

FIG. 3 is a flowchart of illustrative steps for performing a first pass (phase) of packet replication operations in accordance with some embodiments.

FIG. 4 is a flowchart of illustrative steps for performing a second pass (phase) of packet replication operations in accordance with some embodiments.

FIG. 5 is a diagram of an illustrative sub-broadcast domain forwarding table in accordance with some embodiments.

DETAILED DESCRIPTION

A network device can include one or more processors such as a packet processor configured to handle data packets. In layer 2 (L2) or other local area networks, including virtual local area networks (VLANs), the packet processor can receive a packet that needs to be broadcasted. The packet can be a Broadcast (B) packet, an Unknown unicast (U) packet, or a Multicast (M) packet and is thus sometimes referred to as a "BUM" packet or traffic. Such packet needs to be replicated and conveyed to a desired subset of devices or broadcasted to all devices in a broadcast domain. A "replication set" or a "flood set" may refer to a set or group of members, each of which should receive a copy of the packet. In an L2 network, a replication or flood set can include local (VLAN) members and/or remote members, sometimes referred to as Virtual Extensible LAN Tunnel Endpoint (VTEP) members. The network device can achieve such broadcasting functionality by replicating an incoming packet a number of times depending on the size of the replication set. In certain scenarios, however, the number of members in a replication set might exceed the maximum number of replications supported by the packet processor-a hardware limit sometimes denoted herein as an integer N.

Figure 1:
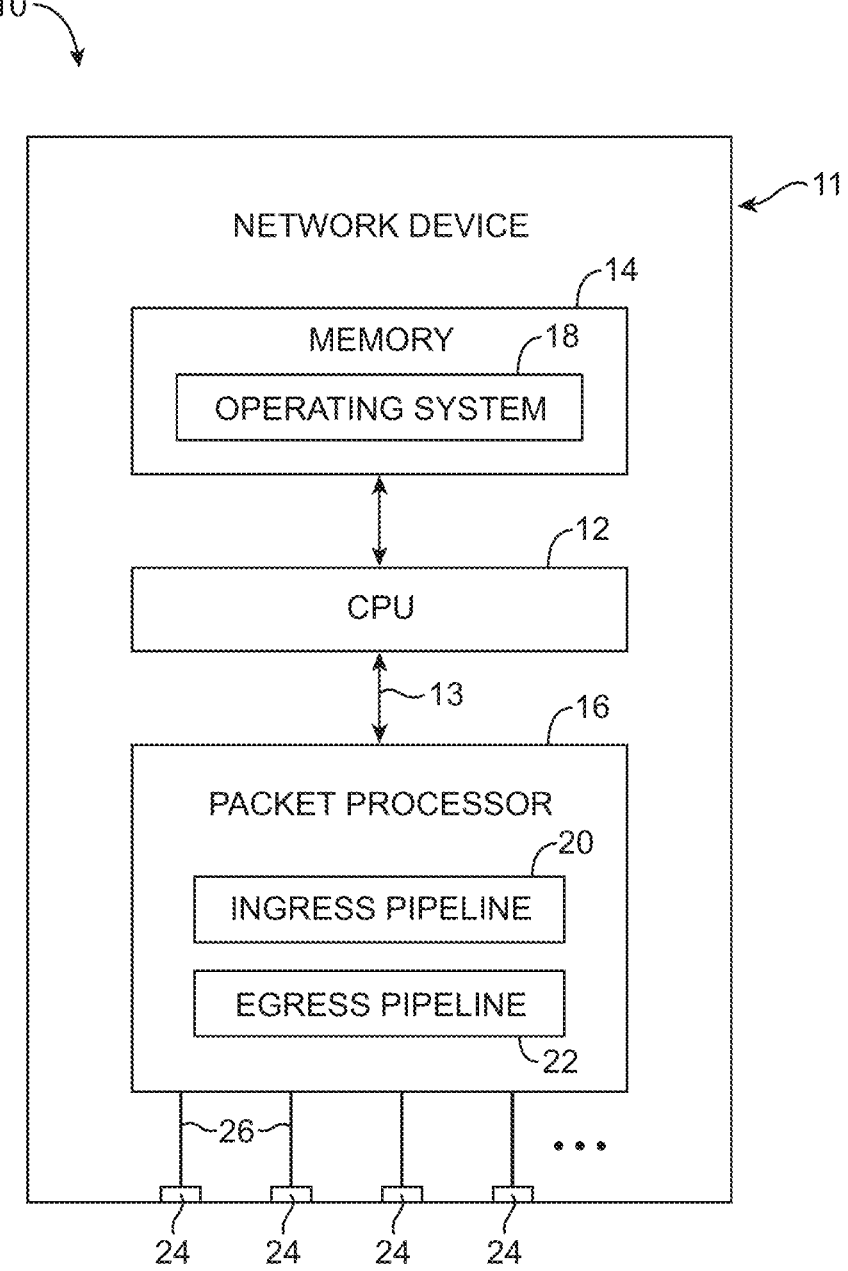
FIG. 1 is a diagram of an illustrative network device configured to route and/or switch data packets in accordance with some embodiments.

To work around such a limitation, a network device such as network device 10 shown in FIG. 1 is provided with improved packet replication capability. Network device 10 can divide the packet replication operations into multiple passes, rounds, or phases of replication. An ingress packet can be associated with a VLAN having a corresponding VLAN identifier (ID). During a first pass/phase, the VLAN ID can be mapped to a first sub-broadcast domain. A first replication set can be assigned to the first sub-broadcast domain, where the first sub-broadcast domain includes a loopback port. The number of members in the first replication set can be limited to no more than N. The packet processor (see, e.g., processor 16) can then replicate the packet and send the replicated packets to other remaining members in the first replication set. In particular, a copy of the packet can be sent to the loopback port along with a tag identifying the first sub-broadcast domain.

During a second pass/phase following the first phase, a copy of the packet will be received at the loopback port. The VLAN ID and the loopback port can be mapped to a second sub-broadcast domain. A second replication set can be assigned to the second sub-broadcast domain. The members in the second replication set can be different than the members of the first replication set. The number of members in the second replication set can also be limited to be less than or equal to N. Packet processor 16 can then replicate the received packet and send the replicated packets to the members of the second replication set. Additional passes or phases can be employed if needed for more replication. Replicating data packets in this way can be technically advantageous and beneficial to provide enhanced network scalability to circumvent hardware limitations. These operations can also optionally be employed to help improve network scalability of layer 3 multicast routing or other similar use cases that require more replications than that supported in hardware.

As shown in FIG. 1, network device 10 may be a router, a switch, a bridge, a hub, a repeater, a firewall, a device serving other networking functions, a network device that includes a combination of these functions, or other types of network elements. As shown in FIG. 1, network device 10 may include processing circuitry such as a central processing unit (CPU) 12, storage circuitry including memory 14, and a packet processing circuit such as packet processor 16 all disposed within a housing 11 of device 10. Housing 11 may be an exterior cover (e.g., a plastic exterior shell, a metal exterior shell, or an exterior shell formed from other rigid or semirigid materials) that provides structural support and protection for the components disposed within the housing. In general, processing unit 12 may represent processing circuitry based on one or more microprocessors, graphics processing units (GPUs), host processors, general-purpose processors, microcontrollers, digital signal processors, application-specific integrated circuits (ASICs), application-specific system processors (ASSPs), programmable logic devices such as field-programmable gate arrays (FPGAs), power management integrated circuits (PMICs), a combination of these processors, or other types of processors. Central processing unit 12 may sometimes be referred to herein as a main processor 12.

Processor 12 may be used to run a network device operating system such as operating system (OS) 18 and/or other software/firmware that is stored on memory 14. Memory 14 may include non-transitory (tangible) computer readable storage media that stores operating system 18 and/or any software code, sometimes referred to as program instructions, software, data, instructions, or code. Memory 14 may include nonvolatile memory (e.g., flash memory or other electrically-programmable read-only memory configured to form a solid-state drive), volatile memory (e.g., static or dynamic random-access memory), hard disk drive storage, and/or other storage circuitry. The processing circuitry and storage circuitry described above are sometimes referred to collectively as control circuitry. Processor 12 and memory 14 are sometimes referred to as being part of a "control plane" of network device 10.

Operating system 18 running in the control plane of network device 10 may exchange network topology information with other network devices using a routing protocol. Routing protocols are software mechanisms by which multiple network devices communicate and share information about the topology of the network and the capabilities of each network device. For example, network routing protocols executed on device 10 may include Border Gateway Protocol (BGP) or other distance vector routing protocols, Enhanced Interior Gateway Routing Protocol (EIGRP), Exterior Gateway Protocol (EGP), Routing Information Protocol (RIP), Open Shortest Path First (OSPF) protocol, Label Distribution Protocol (LDP), Multiprotocol Label Switching (MPLS), intermediate system to intermediate system (IS-IS) protocol, Protocol Independent Multicast (PIM), Virtual Routing Redundancy Protocol (VRRP), Hot Standby Router Protocol (HSRP), and/or other Internet routing protocols (just to name a few). Configurations in which the exchange of route information occurs using Border Gateway Protocol (BGP), or more specifically Multiprotocol BGP (MP-BGP), and/or with Virtual Extensible LAN (VXLAN) or Multiprotocol Label Switching (MPLS) technology (e.g., using VXLAN or MPLS infrastructure, etc.) are sometimes described herein as examples.

Processor 12 may be coupled to packet processor 16 via path 13. Packet processor 16 is oftentimes referred to as being part of a "data plane" or "forwarding plane." Packet processor 16 may represent processing circuitry based on one or more network processing units, microprocessors, general-purpose processors, application specific integrated circuits (ASICs), programmable logic devices such as field-programmable gate arrays (FPGAs), a combination of these processors, or other types of processors. Packet processor 16 may be coupled to input-output ports 24 via paths 26 and receives and outputs data packets via input-output ports 24. Ports 24 that receive data packets from other network elements are sometimes referred to as ingress ports, whereas ports 24 through which packets exit out of device 10 towards other network elements are sometimes referred to as egress ports. Ports 24 are sometimes referred to collectively as ingress-egress ports.

Packet processor 16 can analyze the received data packets, process the data packets in accordance with a network protocol, and forward (or optionally drop) the data packets accordingly. Data packets received in the data plane may optionally be analyzed in the control plane to handle more complex signaling protocols. Memory 14 may include information about the speed(s) of input-output ports 24, information about any statically and/or dynamically programmed routes, any critical table(s) such as forwarding tables or forwarding information base (FIB), critical performance settings for packet processor 16, other forwarding data, and/other information that is needed for proper function of packet processor 16.

A data packet is generally a formatted unit of data conveyed over a network. Data packets conveyed over a network are sometimes referred to as network packets. A group of data packets intended for the same destination should have the same forwarding treatment. A data packet typically includes control information and user data (payload). The control information in a data packet can include information about the packet itself (e.g., the length of the packet and packet identifier number) and address information such as a source address and a destination address. The source address represents an Internet Protocol (IP) address that uniquely identifies the source device in the network from which a particular data packet originated. The destination address represents an IP address that uniquely identifies the destination device in the network at which a particular data packet is intended to arrive.

Data packets received in the data plane may optionally be analyzed in the control plane to handle more complex signaling protocols. Packet processor 16 may be configured to partition data packets received at an ingress port 24 into groups of packets based on their destination address and to choose a next hop device for each data packet when exiting an egress port 24. The choice of next hop device for each data packet may occur through a hashing process (as an example) over the packet header fields, the result of which is used to select from among a list of next hop devices in a routing table stored on memory in packet processor 16. Such routing table listing the next hop devices for different data packets is sometimes referred to as a hardware forwarding table, or a hardware forwarding information base (FIB). The routing table may list actual next hop network devices that are currently programmed on network device 10 for each group of data packets having the same destination address. If desired, the routing table may also list actual next hop devices currently programmed for device 10 for multiple destination addresses (i.e., device 10 can store a single hardware forwarding table separately listing programmed next hop devices corresponding to different destination addresses). The example of FIG. 1 showing four ingress-egress ports 24 is merely illustrative. In general, packet processor 16 can be coupled to up to ten input-output ports 24, up to twenty input-output ports 24, up to thirty input-output ports 24, up to fifty input-output ports 24, up to a hundred input-output ports 24, or more than a hundred input-output ports 24.

Packet processing block 16 of FIG. 1 may generally represent one or more packet processors. Each packet processor 16 may include a packet processing pipeline that includes an ingress pipeline 20 and an egress pipeline 22. Each port 24 may have its own ingress pipeline 20 and its own egress pipeline 22. Data packets received at an ingress port 24 may be processed by an ingress pipeline 20 associated with that ingress port, whereas data packets transmitted from an egress port 24 may be processed using an egress pipeline 22 associated with that egress port. Ingress pipeline 20 may forward a data packet to egress pipeline 22 corresponding to a port 24 on which the packet will egress from device 10. Ingress pipeline 20 may include selection circuitry (sometimes referred to as a selector) configured to direct an intermediate data packet and associated metadata produced in the ingress pipeline to an appropriate egress pipeline 22. The selector within ingress pipeline 20 can select an egress pipeline 22 based on information contained in the received data packet.

In some embodiments, network device 10 can be based on a scalable architecture that includes multiple interconnected network chips where the packet processing functionality is distributed between separate ingress and egress pipelines. For example, ingress pipeline 20 and egress pipeline 22 can be implemented using separate logic circuitry. As another example, ingress pipeline 20 and egress pipeline 22 can be implemented as part of separate integrated circuit (IC) chips.

Ingress pipeline 20 can include a parser and a processing engine, sometimes referred to as an ingress parser and an ingress processing engine, respectively. Ingress pipeline 20 can use ingress lookup and editing tables (sometimes referred to as ingress data tables) to provide editing instructions based on the contents of an ingress data packet to drive the ingress processing engine. Generally, when a data packet is received on a port 24 of network device 10, the received data packet feeds into an ingress pipeline 20 associated with that port 24. The parser of that ingress pipeline 20 parses the received data packet to access portions of the data packet. The parsed information can be used as search/lookup keys into ingress data tables to produce metadata that is then used to identify a corresponding egress pipeline and to direct processing in the egress pipeline (e.g., to bridge or route the data packet, to selectively add a tunnel header, etc.).

In some instances, lookup operations can be performed using the ingress data tables to obtain editing instructions that feed into the processing engine to direct editing actions on the data packet. In other instances, the ingress packet might not be edited. In either scenario, the data packet output from an ingress pipeline can sometimes be referred to herein as an "intermediate packet." The intermediate data packet and the metadata output from an ingress pipeline can be forwarded by its associated selector and queued towards an appropriate egress pipeline. In some embodiments, the selector can select the egress pipeline based on information contained in the metadata and/or information contained in the ingress data packet.

Egress pipeline 22 can include its own parser and processing engine. The egress pipeline can include a parser and a processing engine, sometimes referred to as an egress parser and an egress processing engine, respectively. The egress pipeline can access egress lookup and editing tables (sometimes referred to as egress data tables) to provide editing instructions to the egress processing engine. Generally, when the selector transmits the intermediate data packet from the ingress pipeline to the egress pipeline, the egress parser of the egress pipeline can parse the received intermediate packet to access portions of that packet. Various lookups can be performed on the egress data tables using the parsed data packet and the metadata to obtain appropriate editing instructions that feed into the egress processing engine. The editing instructions can direct actions performed by the egress processing engine to produce a corresponding egress data packet.

Figure 2:
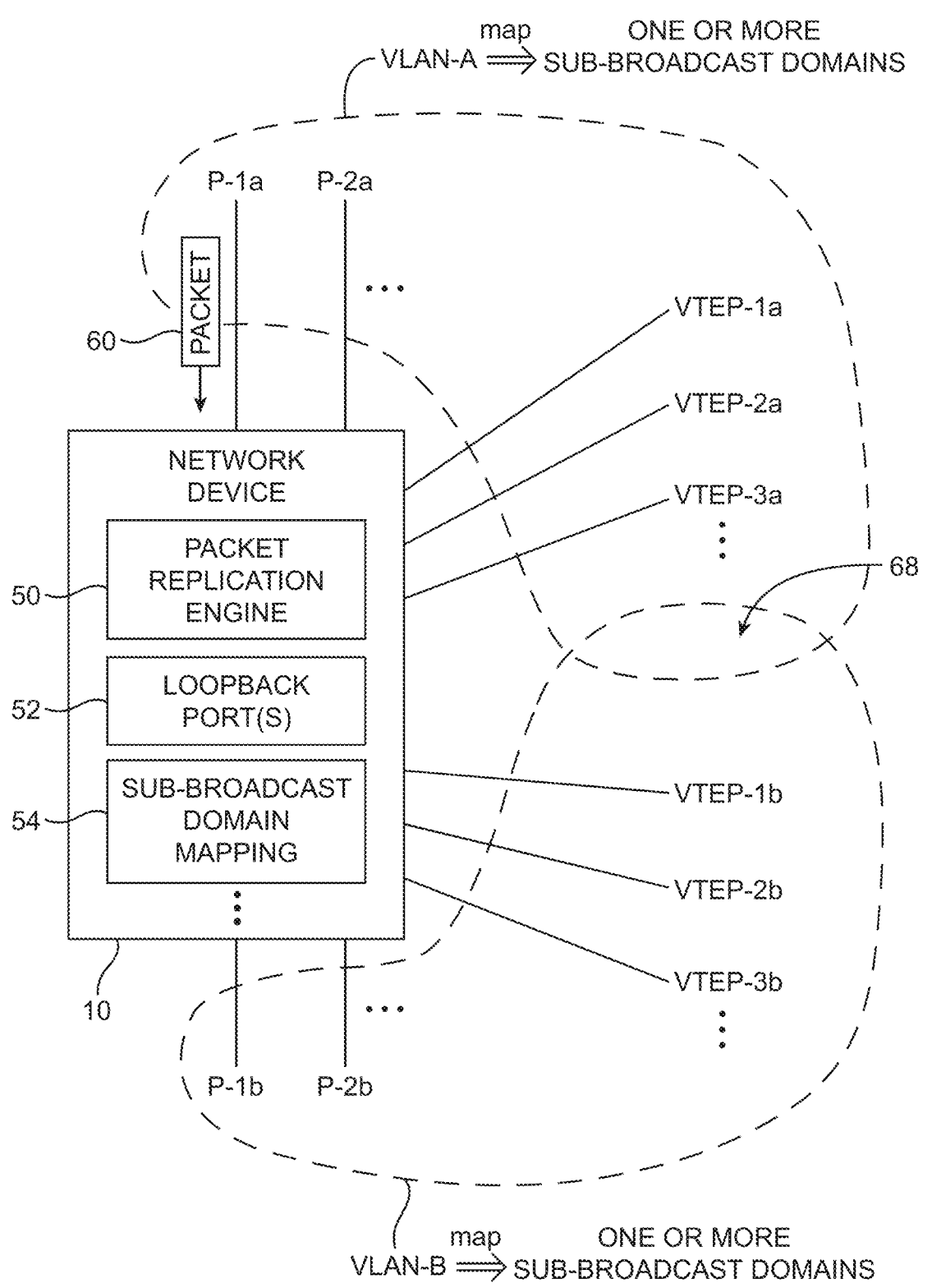
FIG. 2 is a diagram showing how an illustrative network device can be coupled to different virtual local area networks (VLANs) in accordance with some embodiments.

FIG. 2 is a diagram showing how network device 10 can be coupled to one or more virtual local area networks (VLANs). As shown in FIG. 2, network device 10 of the type described in connection with FIG. 1 can be communicatively coupled to a first VLAN such as VLAN-A and can be communicatively coupled to a second VLAN such as VLAN-B. The first VLAN, sometimes referred to as a first broadcast domain, can be mapped to one or more first sub-broadcast domains. Each of the first sub-broadcast domains can be identified by a respective tag, sometimes referred to as a sub-broadcast domain tag (e.g., different sub-broadcast domains can be identified by different tags). Similarly, the second VLAN, sometimes referred to as a second broadcast domain, can be mapped to one or more second sub-broadcast domains. Each of the second sub-broadcast domains can be identified by a respective sub-broadcast domain tag. The first and second VLANs can optionally overlap, as indicated by overlapping region 68.

In the arrangement of FIG. 2, consider a scenario in which network device 10 receives a data packet such as packet 60 via a given local port such as port P-1a (e.g., an Ethernet port that is part of the first VLAN-A). Data packet 60 needs to be broadcasted to other ports that are part of the same VLAN. Data packet 60 that needs to be broadcasted can be a broadcast packet, an unknown unicast packet, or a multicast packet, and can sometimes be referred to herein as a BUM packet or traffic. Packet 60 may, for example, have a destination media access control (MAC) address with all bits set to "1."

In response to receiving packet 60, network device 10 may be configured to replicate, using a packet replication subsystem such as packet replication engine 50, packet 60 a number of times depending on a replication set associated with VLAN-A (see, e.g., a group of ports surrounded by the dotted region associated with VLAN-A). A "replication set" can refer to or be defined herein as a set or group of "members" (or ports) that should receive a copy/duplicate of packet 60. A replication set can sometimes also be referred to as a "flood set." In an L2 network, a replication set can include all local members of the given VLAN, all remote members of the VLAN (e.g., all VTEPs learned statically or dynamically), and optionally other types of members to which all BUM traffic are replicated. The replication set of a given VLAN is thus sometimes referred to and defined herein as a VLAN replication set. In other words, packet 60 needs to be replicated in accordance with the VLAN replication set.

In the example of FIG. 2, the VLAN replication set associated with VLAN-A can include local ports P-1a and P-2a (e.g., Ethernet ports), sometimes referred to as "local members" or local VLAN members of the VLAN replication set, and also virtual/logical ports labeled as VTEP-1a, VTEP-2a, and VTEP-3a. Ports VTEP-1a, VTEP-2a, and VTEP-3a can be Virtual Extensible LAN Tunnel Endpoint (VTEP) ports, sometimes referred to as "remote members" or remote VLAN/VTEP members. First remote member VTEP-1a can be identified by a first VTEP IP address, second remote member VTEP-2a can be identified by a second VTEP IP address, and third remote member VTEP-3a can be identified by a third VTEP IP address.

Each remote member in the VLAN replication set may represent a separate Virtual Extensible LAN (VXLAN) Tunnel Endpoint in a VXLAN overlay network. A VTEP serves as an endpoint for VXLAN tunnels, which enables creation of virtual layer 2 (L2) networks over an underlying layer 3 (L3) network infrastructure. The different layers (L2 and L3) can refer to different layers of the OSI (Open Systems Interconnection) model, where L2 can correspond to a data link layer and where L3 can correspond to a network layer. VTEPs can be configured to encapsulate and decapsulate data packets as they enter and exit the VXLAN network, respectively. Network device 10 can receive packets, at least some of which can be a Broadcast (B) packet, an Unknown unicast (U) packet, or a Multicast (M) packet and is thus sometimes referred to as a "BUM" packet or traffic. VTEPs can also be configured to efficiently handle BUM traffic within the VXLAN network. BUM traffic can be managed using mechanisms such as learning, flooding, and replication to ensure proper delivery to intended recipients in the network while minimizing traffic congestion.

Although the example of FIG. 2 illustrates the replication set of VLAN-A as including two local members P-1a and P-2a and three remote members VTEP-1a, VTEP-2a, and VTEP-3a, the replication set of VLAN-A can generally include any number of local members (e.g., one or more local ports, two to ten local ports, or more than ten local ports) and any number of remote members (e.g., one or more VTEPs, more than 10 VTEPs, hundreds or thousands of VTEPs, etc.). In general, the local VLAN members such as members P-1a and P-2a may represent a first type of members, whereas the remote VTEP members such as members VTEP-1a, VTEP-2a, and VTEP-3a may represent a second type of members. If desired, network device 10 can be communicatively coupled to more than two types of members within any given VLAN.

Referring now to the second VLAN, a BUM packet being received by a port associated with VLAN-B can have its own associated replication set (see, e.g., a group of ports surrounded by the dotted region associated with VLAN-B). In the example of FIG. 2, the replication set of VLAN-B can include local ports P-1b and P-2b (e.g., Ethernet ports), sometimes referred to as "local members" or local VLAN members of the VLAN replication set, and also virtual/ logical ports labeled as VTEP-1b, VTEP-2b, and VTEP-3b. Ports VTEP-1b, VTEP-2b, and VTEP-3b can be Virtual Extensible LAN Tunnel Endpoint (VTEP) ports, sometimes referred to as "remote members" or remote VLAN/VTEP members. Fourth remote member VTEP-1b can be identified by a fourth VTEP IP address, fifth remote member VTEP-2b can be identified by a fifth VTEP IP address, and sixth remote member VTEP-3b can be identified by a sixth VTEP IP address. Although the example of FIG. 2 illustrates the replication set of VLAN-B as including two local members P-1b and P-2b and three remote members VTEP-1b, VTEP-2b, and VTEP-3b, the replication set of VLAN-B can generally include any number of local members (e.g., one or more local ports, two to ten local ports, or more than ten local ports) and any number of remote members (e.g., one or more VTEPs, more than 10 VTEPs, hundreds or thousands of VTEPs, etc.).

Packet replication engine 50 of device 10 can have a hardware limitation on the maximum number of replications, sometimes denoted herein by a fixed integer "N," that can be made for a single packet. As examples, N can be equal to 1024, 2048, less than 1000, less than 2000, less than 3000, an integer between 1000 and 2000, an integer between 2000 and 3000, or other predetermined integer value. In certain applications, however, an ingress packet 60 might be associated with a replication set having a number of members, sometimes denoted herein by an integer "M" or replication/flood set capacity, that is greater than N. This hardware limitation of packet replication engine 50 can restrict the scalability of network device 10 in supporting VLANs and/or VXLANs.

In accordance with an embodiment, a given VLAN or its associated VLAN identifier (ID) can be mapped to one or more sub-broadcast domains so that when M is greater than N, the members of the replication set can be distributed among multiple sub-broadcast domains such that the number of replications performed for each sub-broadcast domain will be less than N. In other words, packet replication operations can be divided into multiple passes or rounds, where each pass can involve performing a number of replications that is less than N for a respective sub-broadcast domain. In some embodiments, different VLAN identifiers can optionally be mapped to the same sub-broadcast domain.

FIG. 3 is a flowchart of illustrative steps for performing a first pass or phase of packet replication operations in accordance with some embodiments. During the operations of block 100, network device 10 may receive on a given port a packet that needs to be replicated. In the example of FIG. 2, network device 10 may receive on a given local port a data packet 60. Although packet 60 is shown as being received from a local VLAN member such as member P-1a, packet 60 can alternatively be received from a remote VLAN member such as a VTEP. For example, consider the VLAN replication set for packet 60 includes three local members and 1100 remote members, yielding a requisite replication sum of 1102 which might exceed the replication hardware limit N assuming an N=1024.

During the operations of block 102, network device 10 can derive a corresponding VLAN identifier (ID) based on the given port. In the example of FIG. 2, network device 10 may derive a corresponding VLAN ID for the first VLAN-A. In general, a data packet can optionally be tagged with a VLAN ID. The tag can additionally or alternatively be used to identify a particular sub-broadcast domain. If a packet is untagged (e.g., if the packet does not have any tags or if the VLAN ID tag field is empty), the VLAN ID can be derived from the ingress port itself. If a packet is tagged (e.g., if the packet has a valid VLAN ID tag field), the VLAN ID from the tag can be used.

During the operations of block 104, network device 10 can map the VLAN ID derived from block 102 and the given port number (e.g., a port number associated with the ingress port receiving packet 60) to a first sub-broadcast domain. This can be a one-to-one (1:1) mapping. The first sub-broadcast domain drives a corresponding sub-broadcast domain replication set which is a subset of the VLAN replication set. The first sub-broadcast domain can sometimes be referred to as a layer 2 (L2) domain.

During the operations of block 106, network device 10 can identify a first sub-broadcast (L2) domain replication set corresponding to the first sub-broadcast domain. This can be done by looking up a sub-broadcast (L2) domain forwarding table. FIG. 5 is a diagram of an illustrative sub-broadcast domain forwarding table 200. As shown in FIG. 5, forwarding table 200 can include a number of entries for different sub-broadcast domains. For example, a first sub-broadcast domain X can be mapped to a first sub-broadcast (L2) domain replication set X, where replication set X can have a first group of members such as mem1x, mem2x, mem3x, and so on. A second sub-broadcast domain Y can be mapped to a second sub-broadcast (L2) domain replication set Y, where replication set Y can have a second group of members such as mem1y, mem2y, mem3y, and so on. A third sub-broadcast domain Z can be mapped to a third sub-broadcast (L2) domain replication set Z, where replication set Z can have a third group of members such as mem1z, mem2z, mem3z, and so on.

In general, table 200 can hold entries for any number of sub-broadcast domains. Each sub-broadcast domain replication set can have a number of members $M_i$ that is set equal to or less than N. The members of each sub-broadcast domain replication set can be different (e.g., the members between the different replication sets X, Y, and Z do not overlap). The L2 domain forwarding table 200 of the type shown in FIG. 5 can sometimes be referred to as a VLAN table or a virtual forwarding instance (VFI) table. Here, for the sake of illustration, the first sub-broadcast domain described in connection with FIG. 3 can be sub-broadcast domain X shown in FIG. 5. The given port at which packet 60 is received can be a member of the first sub-broadcast domain replication set. For example, the first sub-broadcast domain replication set might include the given port at which packet 60 is received, the two other local members in the VLAN replication set, 1020 remote VTEP members, and a local loopback part. This yields a maximum replication count of 1023 (e.g., 2+1020+1), which is within the hardware capability of packet replication engine 50.

During the operations of block 108, network device 10 can replicate packet 60 and optionally tag one or more of the replicated packets (e.g., each replicated packet can be tagged with the VLAN ID). The replicated packets can then be transmitted or broadcasted to remaining members of the first sub-broadcast replication set. As described above, the first sub-broadcast replication set can include a local loopback port. As shown in FIG. 2, network device 10 can include one or more loopback port(s) 52. A "loopback port" 52 can refer to or be defined herein as a virtual internal interface or an external interface which can be configured to operate in a loopback mode through which a replicated packet can be routed back to device 10 itself, creating a loop.

FIG. 4 is a flowchart of illustrative steps for performing a second pass or phase of packet replication operations. The operations of FIG. 4 can thus occur after the operations of FIG. 3. During the operations of block 110, network device 10 can receive on the loopback port a tagged packet (e.g., a packet with an associated VLAN ID tag). The replicated packet being received at the loopback port is sometimes referred to as a loopback packet. Here, it is assumed that the loopback packet was tagged during the operations of block 108 in FIG. 3.

During the operations of block 112, network device 10 can derive the VLAN ID based on the tag in the tagged packet. The tag can reveal the VLAN ID of the loopback packet. The VLAN ID derived during block 112 may be equivalent to the VLAN ID previously derived from during the operations of block 102 in the first pass/phase.

During the operations of block 114, network device 10 can map the VLAN ID derived from block 112 and the loopback port number (e.g., a port number associated with the loopback port receiving the loopback packet) to a second sub-broadcast domain. This mapping of packets ingressing on a loopback port to a new/different sub-broadcast (L2) domain can be handled by a sub-broadcast domain mapping subsystem such as sub-broadcast (L2) domain mapper 54 in device 10 (see FIG. 2). The second sub-broadcast domain drives a corresponding sub-broadcast domain replication set which is another subset of the VLAN replication set.

During the operations of block 116, network device 10 can identify a second sub-broadcast (L2) domain replication set corresponding to the second sub-broadcast domain. This can be done by looking up a sub-broadcast (L2) domain forwarding table such as table 200 of FIG. 5. Here, for the sake of illustration, the second sub-broadcast domain described in connection with FIG. 4 can be sub-broadcast domain Y shown in FIG. 5. For example, the second sub-broadcast domain replication set might include the 80 remaining remote VTEP members from the overall VLAN replication set. The second sub-broadcast domain replication set can thus include fewer members than the first sub-broadcast domain replication set. This yields a remaining replication count of 80, which again is within the hardware capability of packet replication engine 50.

During the operations of block 118, network device 10 can replicate the loopback packet and then transmit or broadcast the replicated packets to the members of the second sub-broadcast replication set to finish sending the BUM packet to all remaining members of the VLAN replication set. The example described in connection with FIGS. 3 and 4 in which a VLAN replication set is divided into two sub-broadcast domain replication sets that are broadcasted over two separate passes/phases is illustrative. As another example, if the VLAN replication set has M members that is greater than 2*N, then the replication operations can be divided into three or more passes, where each pass involves broadcasting replicated packets to a different sub-broadcasting domain. In scenarios where the replication operations are being divided into three or more passes, network device 10 may employ VLAN identifiers not currently used by the system to help distinguish between the second and subsequent ($3^{rd}$, $4^{th}$, etc.) passes. In general, the operations of FIGS. 3 and 4 can be extended to support replicating data packets across three or more phases depending on relative values of N and M. These operations can also optionally be employed to help improve layer 3 multicast routing or other use cases that need more replication than the hardware limit.

The operations of FIGS. 3 and 4 are illustrative. In some embodiments, one or more of the described operations may be modified, replaced, or omitted. In some embodiments, one or more of the described operations may be performed in parallel. In some embodiments, additional processes may be added or inserted between the described operations. If desired, the order of certain operations may be reversed or altered and/or the timing of the described operations may be adjusted so that they occur at slightly different times. In some embodiments, the described operations may be distributed in a larger system.

Figure 6:
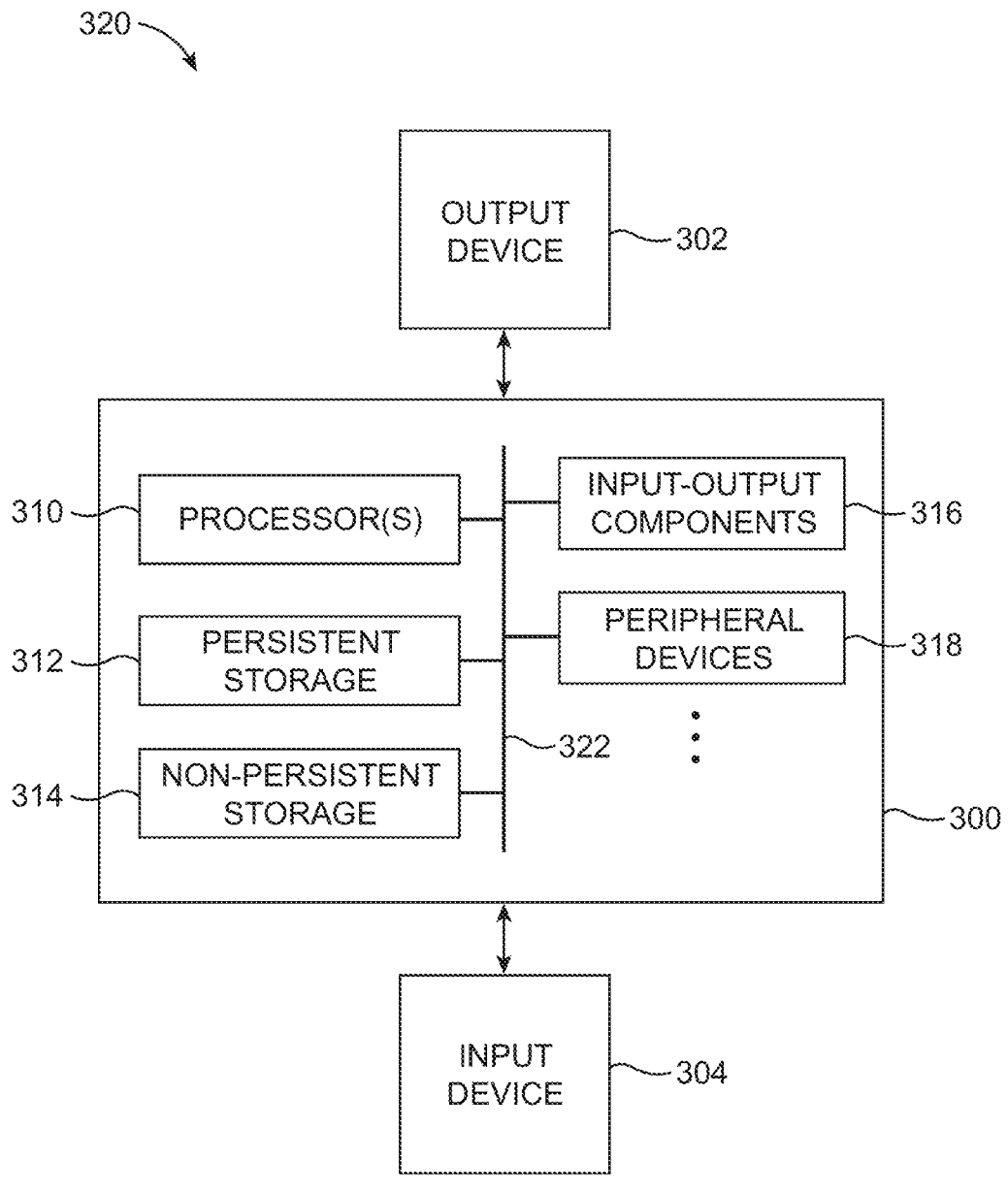
FIG. 6 is a diagram showing illustrative hardware components that can be included within a data processing system in accordance with some embodiments.

The foregoing embodiments may be made part of a larger system. FIG. 6 shows a system such as data processing system 320. Data processing system 320 may include a network device 300 optionally coupled to an input device 104 and/or an output device 102. Network device 300 may represent a network device 10 described in connection with the embodiments of FIGS. 1-5. Network device 300 may include one or more processors 310 (e.g., CPU 12 of FIG. 1), storage circuitry such as persistent storage 312 (e.g., flash memory or other electrically-programmable read-only memory configured to form a solid-state drive, a hard disk drive, etc.), non-persistent storage 314 (e.g., volatile memory such as static or dynamic random-access memory, cache memory, etc.), or any suitable type of computer-readable media for storing data, software, program code, or instructions, input-output components 316 (e.g., communication interface components such as a Bluetooth® interface, a Wi-Fi® interface, an Ethernet interface, an optical interface, and/or other networking interfaces for connecting device 300 to the Internet, a local area network, a wide area network, a mobile network, other types of networks, and/or to another network device), peripheral devices 318, and/or other electronic components. These components can be coupled together via a system bus 322.

As an example, network device 300 can be part of a host device that is coupled to one or more output devices 302 and/or to one or more input device 304. Input device(s) 304 may include one or more touchscreens, keyboards, mice, microphones, touchpads, electronic pens, joysticks, buttons, sensors, or any other type of input devices. Output device(s) 306 may include one or more displays, printers, speakers, status indicators, external storage, or any other type of output devices.

System 320 may be part of a digital system or a hybrid system that includes both digital and analog subsystems. System 320 may be used in a wide variety of applications as part of a larger computing system, which may include but is not limited to: a datacenter, a financial system, an e-commerce system, a web hosting system, a social media system, a healthcare/hospital system, a computer networking system, a data networking system, a digital signal processing system, an energy/utility management system, an industrial automation system, a supply chain management system, a customer relationship management system, a graphics processing system, a video processing system, a computer vision processing system, a cellular base station, a virtual reality or augmented reality system, a network functions virtualization platform, an artificial neural network, an autonomous driving system, a combination of at least some of these systems, and/or other suitable types of computing systems.

The methods and operations described above in connection with FIGS. 1-6 may be performed by the components of a network device using software, firmware, and/or hardware (e.g., dedicated circuitry or hardware). Software code for performing these operations may be stored on non-transitory computer readable storage media (e.g., tangible computer readable storage media) stored on one or more of the components of the network device. The software code may sometimes be referred to as software, data, instructions, program instructions, or code. The non-transitory computer readable storage media may include drives, non-volatile memory such as non-volatile random-access memory (NVRAM), removable flash drives or other removable media, other types of random-access memory, etc. Software stored on the non-transitory computer readable storage media may be executed by processing circuitry on one or more of the components of the network device (e.g., processor 12 and/or processor 16 of FIG. 1, processor 310 of FIG. 6, etc.).

The foregoing is merely illustrative and various modifications can be made to the described embodiments. The foregoing embodiments may be implemented individually or in any combination.

What is claimed is:

1. A method of operating a network device comprising:

receiving, on a given port, a packet to be replicated in accordance with a virtual local area network (VLAN) replication set having a number of members;

identifying a first sub-broadcast domain for the packet;

identifying a first sub-broadcast domain replication set corresponding to the first sub-broadcast domain, the first sub-broadcast domain replication set having a number of members less than the number of members in the VLAN replication set;

replicating the packet and sending at least one of the replicated packets to a loopback port that is a member of the first sub-broadcast domain replication set; and mapping the loopback port to a second sub-broadcast domain.

2. The method of claim 1, further comprising:

broadcasting the replicated packets to at least a portion of the members in the first sub-broadcast domain replication set.

3. The method of claim 2, further comprising:

tagging the replicated packets with a tag comprising a virtual local area network (VLAN) identifier.

4. The method of claim 3, further comprising:

receiving the at least one of the replicated packets at the loopback port; and deriving the VLAN identifier based on the tag in the at least one of the replicated packets.

5. The method of claim 1, further comprising:

identifying a second sub-broadcast domain replication set corresponding to the second sub-broadcast domain.

6. The method of claim 5, wherein the first sub-broadcast domain replication set comprises a first set of local and remote members and wherein the second sub-broadcast domain replication set comprises a second set of local and remote members different than the first set of local and remote members.

7. The method of claim 5, further comprising:

replicating the at least one of the replicated packets received at the loopback port to produce corresponding additional replicated packets; and broadcasting the additional replicated packets to members in the second sub-broadcast domain replication set.

8. The method of claim 1, wherein identifying the first sub-domain broadcast domain for the packet comprises deriving a virtual local area network (VLAN) identifier based on the given port.

9. The method of claim 8, wherein identifying the first sub-domain broadcast domain for the packet further comprises mapping the VLAN identifier to the first sub-broadcast domain.

10. The method of claim 1, wherein identifying the first sub-broadcast domain replication set corresponding to the first sub-broadcast domain comprises looking up a sub-broadcast domain forwarding table having entries for a plurality of different sub-broadcast domains including the first sub-broadcast domain.

11. A method of operating a network device comprising:

receiving a packet to be replicated in accordance with a virtual local area network (VLAN) replication set;

dividing the VLAN replication set into a plurality of sub-broadcast domain replication sets; and during a first replication phase, replicating the packet a number of times for members of a first sub-broadcast domain replication set in the plurality of sub-broadcast domain replication sets, wherein the first sub-broadcast domain replication set includes a local member representing an ingress port of the network device at which the packet is received and a loopback port configured to receive a replicated packet produced during the first replication phase.

12. The method of claim 11, further comprising:

during a second replication phase different than the first replication phase, replicating the packet a number of times for members of a second sub-broadcast domain replication set in the plurality of sub-broadcast domain replication sets.

13. The method of claim 12, further comprising:

during a third replication phase different than the first and second replication phases, replicating the packet a number of times for members of a third sub-broadcast domain replication set in the plurality of sub-broadcast domain replication sets.

14. The method of claim 12, wherein the second sub-broadcast domain replication set comprises fewer members than the first sub-broadcast domain replication set.

15. A method of operating a network device comprising:

receiving a packet to be replicated a first number of times;

during a first phase, replicating the packet a second number of times less than the first number of times to produce first replicated packets; and during a second phase, replicating the packet a third number of times less than the second number of times to produce second replicated packets.

16. The method of claim 15, further comprising:

sending the first replicated packets to members associated with a first layer 2 (L2) domain; and sending the second replicated packets to members associated with a second layer 2 (L2) domain.

17. The method of claim 16, wherein the members associated with the first L2 domain comprises local virtual local area network (VLAN) members and remote Virtual Extensible Local Area Network Tunnel Endpoint (VTEP) members.

18. The method of claim 16, wherein the members associated with the first L2 domain comprises a loopback port, the method further comprising:

receiving, at the loopback port, at least one of the first replicated packets; and mapping the at least one of the first replicated packets received at the loopback port to the second L2 domain.

* * * * *